United States Patent [19]

Feinleib

[11] 4,421,406
[45] Dec. 20, 1983

[54] MOBILE COPIER

[76] Inventor: Sidney Feinleib, 87 Oakley Rd., Belmont, Mass. 02178

[21] Appl. No.: 389,570

[22] Filed: Jun. 17, 1982

Related U.S. Application Data

[63] Continuation of Ser. No. 119,933, Feb. 8, 1980, abandoned.

[51] Int. Cl.³ ............... G03B 27/48; G03B 27/50; G03B 27/70
[52] U.S. Cl. .......................... 355/84; 355/51
[58] Field of Search ................ 355/1, 8, 11, 51, 102, 355/103, 108, 84, 21

[56] References Cited

U.S. PATENT DOCUMENTS 3,884,578  5/1975  Roosen ....................... 355/84

FOREIGN PATENT DOCUMENTS 392283  5/1933  United Kingdom ............... 355/51

Primary Examiner—Richard A. Wintercorn
Attorney, Agent, or Firm—Donald Brown

[57] ABSTRACT

A mobile copier structured to be held in the hand and moved across the surface of the matter to be copied, comprising a support, a printable paper mounted on the support movable increment-by-increment across the matter to be printed in consonance with movement of the support thereacross, an optical train on the support for focusing the matter to be printed on the printable paper, a source of light for intermittently illuminating the matter to be printed and, optionally, a fixing and developing medium. The support is structured in two parts detachably connected, one of which contains the printable paper and the fixing and developing mediums, if employed, and is removable from the other part for replenishing the paper and developing medium.

5 Claims, 8 Drawing Figures

MOBILE COPIER

This is a continuation, of application Ser. No. 119,933 filed Feb. 8, 1980 now abandoned.

BACKGROUND OF INVENTION

The need for a convenient personal portable copier has led to the development of several copier systems during the past eighty years. Three inventors have been responsible for the major development in the field. The first of these, George C. Beidler, developed the Rectigraph machine which was manufactured and marketed by the Rectigraph Company which was later brought out by the Haloid Company which itseif later became the Xerox Corporation. The second, Dr. Carl S. Miller developed a process known as thermography and, at about the same time, the third, Chester F. Carlson, developed a process known as electrophotography which is the base upon which the success of the Xerox Corporation rests.

The problem to which all three of these men addressed themselves, that is, the creation of a device which would enable the user to copy portions to documents conveniently, was not solved by their work. Documents must still be brought to the copiers since all existing copiers require a power source which is not movable. The user of a copier is still dependent upon the availability of the equipment. In instances in which a copier is not available, the user must either copy the material by hand or make photographic reproductions.

The instant invention is concerned with the development of a hand-held, battery-operable, portable, personal copier. Basically, the copier is a short focal length camera with a built-in flash unit. Movement of the copier over a document being copied causes a synchronized movement of photosensitive paper through the image plane where it is exposed. The image on the paper is developed in room light, preferably fluorescent "cool white" light.

In principle, many systems may be conceived for a hand-held copier device. While all existing photographic and copier duplication processes can be adapted to produce a miniature copier, many of the commercial and research technologies that have been reported in literature over the past years would yield inconvenient, expensive or technically inferior devices. The major technical problem relates to providing adequate power for the total system in a compact, low weight unit of about one pound. Other technical problems include the requirement for high voltages, liquid or hazardous vapor developers and long development times.

Surveys show that it is essential that a portable, hand-held copier be foolproof and that it require almost no training to use. In addition, the following specifications are found to be essential: that it be easy to use with no messy or smelly chemicals or processes, that it be safe to use with no chance of fire or damage to the original documents or books being copied, that the cost be within the area of $35.00 to $100.00, that the size be approximately that of a portable calculator, that the development be rapid, that it be able to copy an image of about a newspaper column width, that the cost of supplies be $0.02 to $0.45 per 25 centimeter strip, that there be adequate life of the power supply for perhaps 100 strips with low-cost, rechargeable batteries, that modular loading of the paper cartridge and simple replacement or recharging of the batteries be available, and that there be widespread availability of supplies. The copier herein described and claimed embodies the foregoing requisites.

SUMMARY OF INVENTION

As herein illustrated, the copier comprises a mobile, hand-held structure movable across the matter to be copied, provided with a printable paper adapted to be moved increment-by-increment in consonance with the movement of the copier across the matter to be copied, an optical train for focusing an image of the material to be printed and means for exposing the printable paper. More specifically, the copier comprises a housing, tractor means mounted thereon arranged to guide and traverse the housing relative to the surface of the matter to be copied, and means operable by movement of the housing as it is traversed across the matter to be copied to correspondingly move the printable paper into position for printing. The optical train includes a reflector and lens system for receiving and focusing successive increments of the matter to be printed on successive portions of the printable paper. The tractor means may comprise spaced, parallel tractor belts mounted parallel to the movement of the copier or wheels. When wheels are employed, tracks may be provided adapted to be placed astride the matter to be printed upon which the wheeled structure is movable.

The reflector is disposed at an angle of 45° to the surface of the matter to be printed and the lens sytem is arranged to receive the reflected image and transfer and focus it in the plane of the printable paper. The printable paper is supported in a plane at the focus of the lens at right angles to the line of sight of the lens system. The structure is comprised of removably connected parts (modules), one of which mounts the tractor means and the optical train and the other of which mounts the printable paper and, optionally, a fixing and developing medium, the latter part being designed to be removed and replaced with a fresh supply of paper and printing medium.

The invention will now be described in greater detail with reference to the accompanying drawings, wherein.

Figure 2:
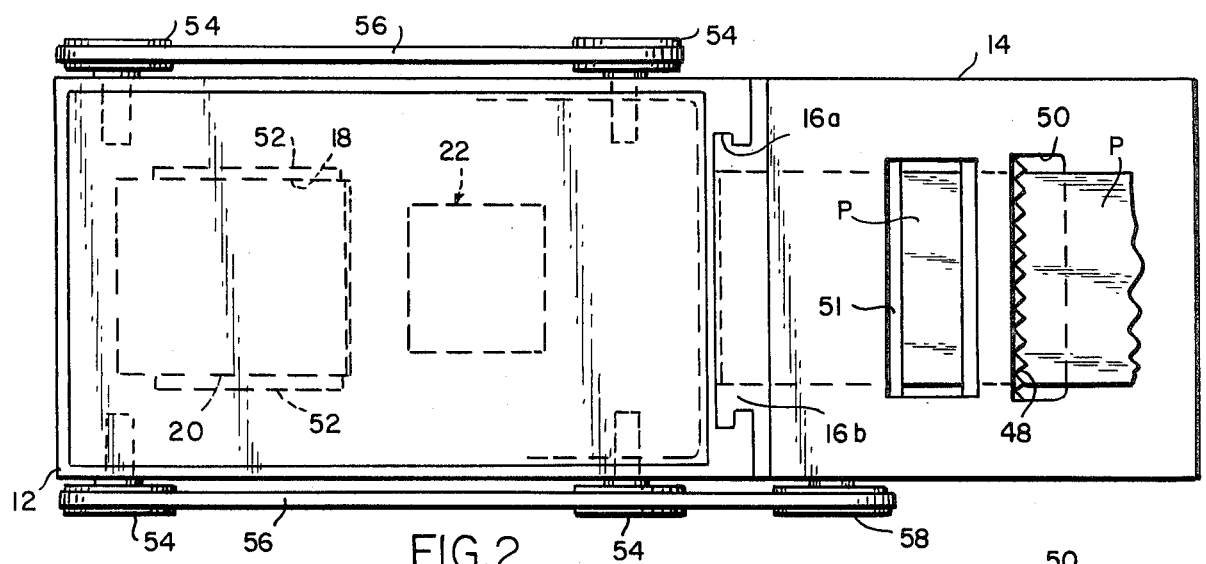
FIG. 2 is a plan view to larger scale looking downwardly at the top of the copier.
Figure 1:
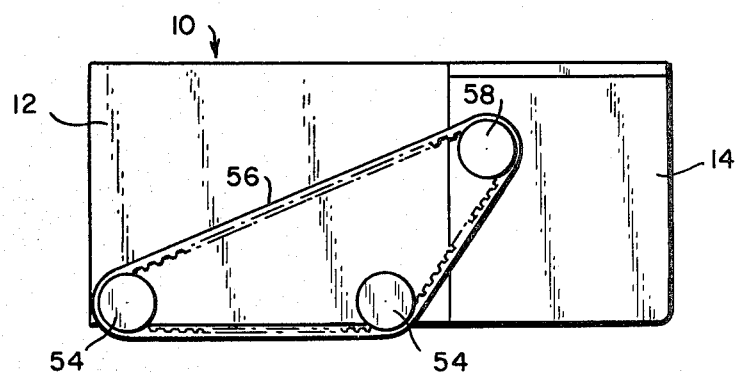
FIG. 1 is an elevation as seen from one side.
Figure 4:
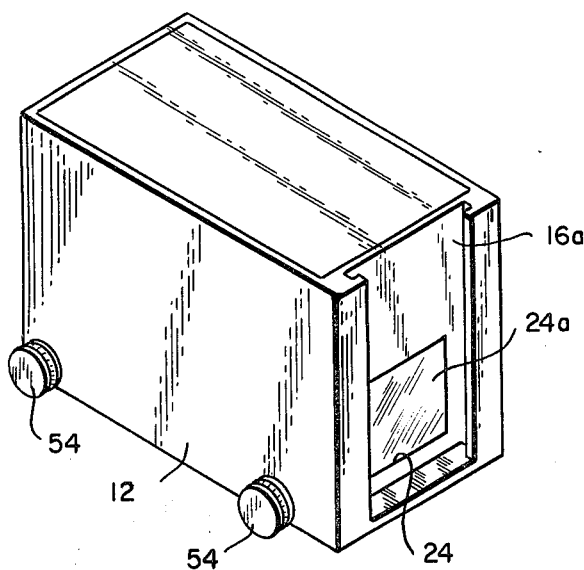
FIG. 4 is a perspective of one of the component parts of the copier.
Figure 5:
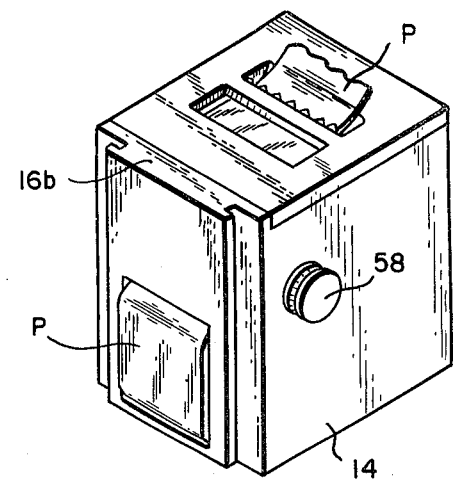
FIG. 5 is a perspective of the other of the component parts of the copier.

Referring to the drawings, FIGS. 1,4 and 5, the copier comprises a structure 10 of substantially rectangular, horizontal and vertical section constructed of two parts or modules 12 and 14 which are removably connected to each other by means of a dovetail joint comprising a mortise 16a and tenon 16b as shown, for example, in FIGS. 2, 4 and 5. Each of the modules 12 and 14 is a complete unit in itself, the latter being expendable.

Figure 3:
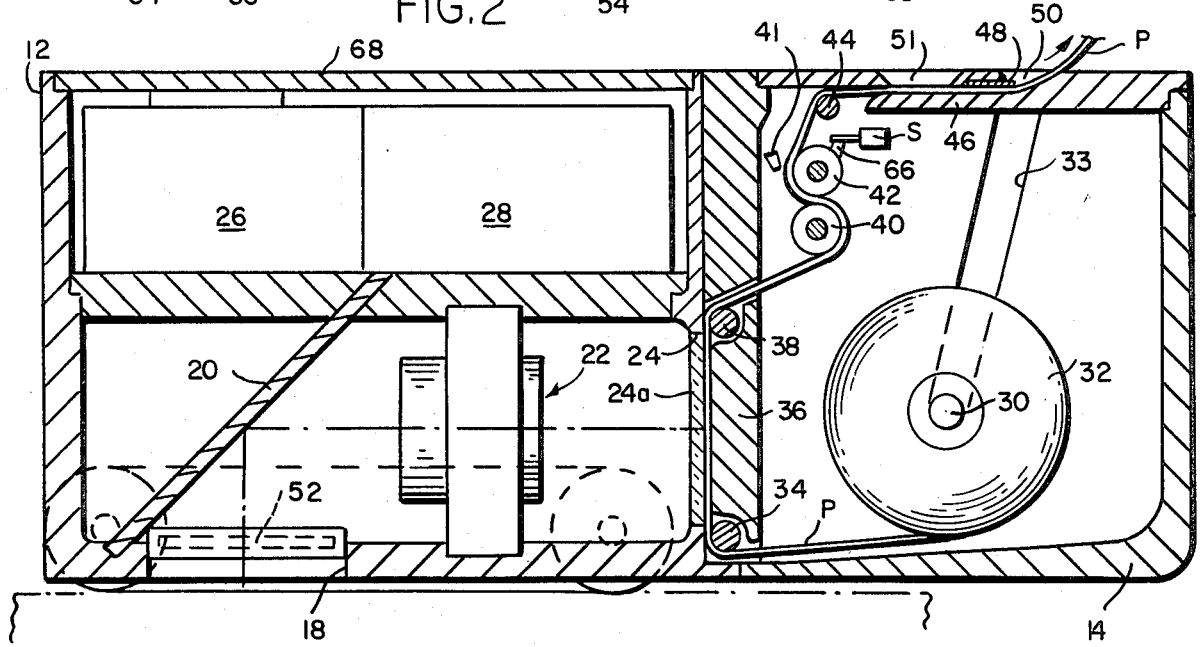
FIG. 3 is a vertical section taken on the line 3—3 of FIG. 2.

The module 12, FIG. 3, contains a bottom opening 18 of substantially rectangular configuration and above the opening an inclined mirror 20 or equivalent reflecting device arranged to reflect an image of the matter to be copied upon which the copier rests through an angle of 90° in a direction parallel to the surface on which the copier resets. A lens system 22 is supported in the module 12 so that its line of sight coincides with the line of the reflected image. The right-hand end of the module 12 as shown in FIG. 3 contains a rectangular window opening 24 corresponding substantially in size to the opening 18 through which the reflected image is directed. The opening 24 may contain a windowpane 24a. Above the mirror and the lens system there are mounted a power pack 26 and batteries 28. One or more lamps 52 are mounted at the sides of the opening 18 to provide for lighting the material to be copied. Optionally, the mirror and lens system may be replaced with a fiber optic bundle as conventionally employed in some commercial copiers.

The module 14, FIGS. 3 and 5, has mounted at its bottom a roll 32 of printable paper. Desirably, the roll is provided with a rigid spindle, the ends of which protrude and can be rotatably mounted at the bottom of slots 33—33 in the side walls of the module. Paper P from the roll is led from the underside beneath a guide roll 34 upwardly between the window opening 24 and a backing member 36 over a guide member 38 between a pair of feed rolls 40 and 42 and from thence over a guide roll 44 across a support member 46 and from thence across the edge of a serrated blade 48 and through a slot 50 at the top. The roll 42 is spring-biased toward the roll 40. The backing member 36 holds the paper as it passes by the window opening 24 in a plane perpendicular to the line of sight of the lens system. An opening 51 is provided at the top to assist in threading the paper. Optionally, the roll of paper may simply be placed at the bottom of the module and allowed to unwind freely as the paper is withdrawn.

There may also be mounted in the module 14 means for fixing and developing the exposed paper. As herein illustrated, this means is diagrammatically indicated at 41 as a nozzle or brush for applying a fixing and developing medium to the surface of the paper such as has been used in Polaroid and like instant developing cameras. Alternatively, a paper having a fixed and developing medium on its surface releasable by the pressure of the pressure roll 42 against the roll 40 may be used. It is to be understood that any printable paper which is consistent with the use herein envisioned may be used as is intended to be within the scope of this invention.

Figure 7:
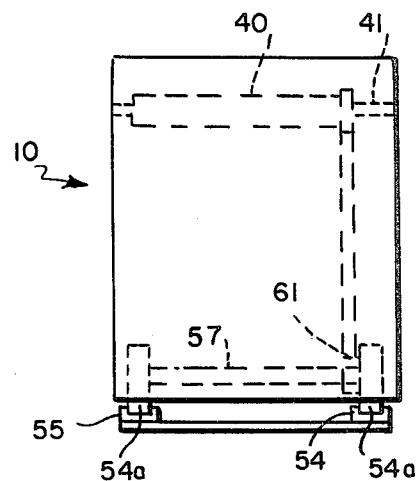
FIG. 7 is a vertical section showing the copier provided with inside supporting wheels which support the copier on the track and a drive from the wheel shaft to the feed roll shaft.

The entire structure comprising the parts 12 and 14 is designed to be moved along the surface to be copied and, to this end, pairs of wheels 54—54 are mounted on stub shafts at the bottom of the module 12 and tractor-line belts 56—56 are entrained about the wheels on which the structure comprising the modules 12 and 14 may be placed upon the surface of the documents to be copied and moved therealong. Desirably, the wheels and tractor belts are provided with teeth and mating slots to achieve precision. Optionally, the wheel and tractor belts may be omitted and rubber-tired wheels 54a—54a substituted therefor as shown in FIG. 7. The rubber-tired wheels may be rolled directly on the document to be copied or on tracks 55—55 placed astride the document. The wheels are fixed to a shaft 57 journaled in the side walls and there is a sprocket 61 fixed to the drive for driving the shaft to which the feed roll is fixed.

The feed roll 40, FIGS. 1 and 3, for drawing the paper from the roll of paper is fixed to a shaft 41 which has an end extending from one side of the module and a wheel 58 is fixed thereto. The belt 56 at that side is extended about the wheel 58 so that rotation of the wheels 54—54 rotate the wheel 58 and, hence, the shaft 41 which, in turn, drives the feed roll 40 in consonance with the movement of the copier across the document to be copied. The toothed wheels and tractor belts mentioned heretofore provide for accuracy in transmitting the movement of the copier across the documents to be copied to the feed of the paper. If rubber-tired wheels are used instead of tractor belts, a belt or chain drive from one of the wheels to the shaft of the feed roll 40 can be used, FIG. 7.

As thus constructed, when the copier is placed on the surface of the document to be copied and moved along thereon by pressing it downwardly and pulling it back, the belts 56—56 which are traction belts travel around the wheels 54—54, permitting the copier to be moved back relative to the material to be copied and simultaneously rotate the feed roll 40 to pull the paper from the roll 32 past the window opening 25 at a rate which is synchronized with the rate of movement of the copier over the surface. This may be in direct proportion on a one-to-one basis or in some other ratio, but, in any event, the rate of movement across the document to be copied, the rate of feed of the paper and the exposure are timed so that as each incremental length of the paper is unrolled, it is exposed to corresponding incremental lengths of the material to be copied. The paper is withdrawn from the top of the module 14 across the blade 48 and through the slot 50 and torn off along the edge of the blade 48. Desirably, an opening 51 is provided at the top to facilitate threading. If both a fixing medium and a developing medium are used, the image will develop in the ambient light after the paper is withdrawn. If only a fixing agent is applied, the paper will have to be developed in some conventional manner after it is withdrawn. Preferably, as stated, the image is reproduced in the ambient room light "cold light."

The paper is desirably provided in the form of a cartridge 6 centimeters wide by 10 meters long, the power pack is designed to service 20 cartridges of paper before requiring recharging or replacement, and the copy speed should be 3 centimeters of strip per second with continuous movements of the copier. The power pack should weigh less than 0.5 pounds and the resolution of the image should be better than 5 lines per millimeter.

The power pack and battery 26,28 are designed to illuminate the matter to be copied at predetermined intervals corresponding to the length of paper opposite the window opening 24 at any given instance and to accomplish this in synchronism, the feed roll 40 may be provided with a lug 66 arranged so that, for each rotation, it will actuate a switch S in the circuit to illuminate the lamp 52. The belt 56 in this case functions as a timing belt to control the frequency of the flash of the lamp 52. The duration of the flash must be such as to allow an image resolution of 5 lines per millimeter while the copier is being moved across the material to be copied.

The flash lamp and associated electronics are modifications of compact strobe units available from Honeywell. They are powered by standard "C" cell batteries, preferably alkaline cells for long operating life. Two such cells can power about 30,000 flashes through a miniature rare gas lamp.

The copier is designed to expose two square inches (12.5 centimeters square), one flash of a single flash lamp and will yield copies of several hundred pages of large size paper with one set of batteries. The photosensitive paper used is Eastman Kodak 2022 direct print photodevelopable paper. This paper is commercially used in a wide range of oscillographs and other printing devices.

As has been previously stated, the modules 12 and 14 are interconnected by a dovetail joint so that they can be separated from each other. By this arrangement, the module 14 which contains the paper and, optionally, a fixing and developing medium, can be made a replaceable item for attachment to the module 12 when the length of printable paper has been used up. Desirably, the paper may be provided with an adhesive coating on the back side and a cover strip with perforations for feeding.

As previously mentioned, a photosensitive paper is used wherein the development materials are applied to the surface of the paper such as used in polaroid cameras and films or, alternatively, capsules are incorporated into the paper which will release the developing compounds or other reactive chemicals when put through a pressure roll in the copier.

Desirably, the top of the module 12 is provided with a removable or hinged cover 68 to permit replacing the battery of the power pack when required.

The copier as described is of box-like construction having substantially rectangular, horizontal and vertical sections and may be made in different sizes according to the size of the user's hand and for left and right-hand users. The location of the object window and the drive belts or wheels must be such that it is easy to copy up to the binding of a book and so that the copy will not fall off an edge when moved across the original. One way to reduce this problem is to shape the copier like a movie camera with a pistol grip. A related design is that of a hand-held labeling device such as the Label-Matic. The drive belts may be located on the outside. However, it is preferable that all the components including the drive belt be located within the housing to reduce the chance of damage to the copier.

It is essential that the copier be made to shut off automatically when it is not in use in order both to conserve power and to prevent accidental flashing of the lamps when the copier is lifted off the original. This latter precaution is necessary so that the copier will not disturb non-users of the copier near the copier and this may be achieved by providing for two power switches SW1,SW2, one of which is manually-operated and the other pressure-operated so that, in storage, the copier will not operate, but when it is kept in contact with the document, will operate.

In order to regulate the exposure of the sensitive materials (paper) when the copier design uses a "frame at a time" exposure, there must be some relation between the discharge of the power capacitors and the movement of the copier. This may be achieved as heretofore related by using the tractor belt 56 as a timing belt. It is presumed that the capacities can be regenerated to a useful level between flashing sequences. In the event that the copier is moved too quickly across the original, a light-emitting diode 10D8 is incorporated in the circuit to indicate such operation. Light-emitting diodes can also be incorporated to indicate reduced power level of the battery, the ON position of the manual switch and operation of the pressure-sensitive power switch.

While direct printout paper has wide latitude in exposure for developing an image, some exposure control is desired. This can be achieved by mechanical means to adjust apertures by optical means with neutral density and electronic means by regulating the capacitance or discharge rate. All of these are well-known techniques.

As with all single application devices, the design of the components can be optimized for the copier system. The device herein illustrated used only a mirror and lens system for gathering light and imaging it onto the sensitive material. These two components can be especially designed to provide a flat field with a fixed focal length at a very low cost for components. It is expected that the depth of the field can be made adequate so that little or no adjustment of the optical components need be made by the user. Some consideration must be given to the object and image window areas. In the device as herein illustrated, there are no optical components between the lamp and the original or between the lens and the sensitive materials. For this reason, a movable cover is desirable to eliminate the possibility of damage which may automatically be moved out of the way when the copier is pressed onto the original.

Commercially available miniature flash tubes may be used and one tube has been found sufficient.

As previously stated, a development lamp is not required as the ambient light may be relied upon to fix the image. It may, however, be desirable to incorporate a miniature fluorescent lamp in the system for controlling development.

The use of drive belts in the copier as herein illustrated differs from conventional uses of drive belts in that it is also used for traction across the original document being copied. If it should be desirable to separate the functions of contact of the original and movement of the sensitive paper, this could be achieved by using wheels in contact with the original and a drive belt running off a gear on the wheel axis FIG. 7. The drive belt may then be simply a pulling mechanism rather than the expensive precision belts currently used.

Figure 6:
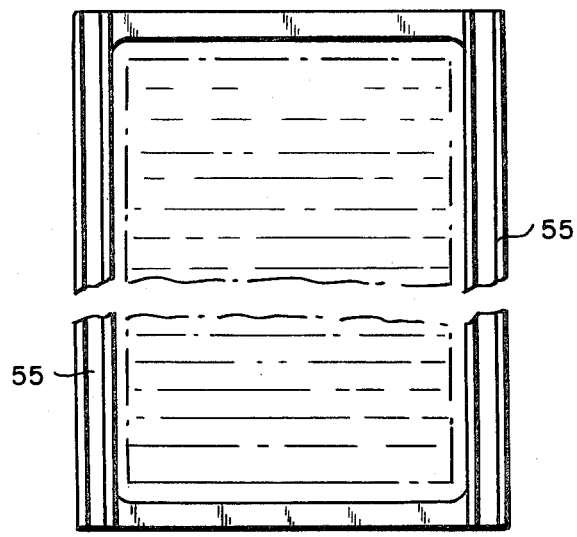
FIG. 6 is a plan view of a supporting track which may be placed astride the document to be copied for supporting the copier for movement across the document.

For more precise control over the linearity of the movement of the copier across the original, it may be useful to use a rack and pinion. This means that the wheels are actually gears and that they ride on a geared rack (track) which is placed on top of the original as illustrated in FIGS. 6 and 7. This type affords greater control over the copier, but makes it more cumbersome to use the device. In addition, the wheels must be recessed so that they do not damage the original in the event an attempt is made to use the copier without the geared rack. The copier is designed to pull a sensitive paper and its backing strip through the copier from a detachable cartridge that can be simply loaded. Since it is expected that some form of hole and sprocket system will be used in drawing the backing paper, there must be an interrelation between the cartridge and copier and the backing paper and sprocket position. A leader from the backing paper which extends outside the cartridge may be used so that insertion of the cartridge into the copier releases the sprocket and allows it to rotate freely until it meshes with a hole in the leader. This can be achieved with a release button on the copier which is also a locking catch for the cartridge to keep it in place. Autoloading is well-known in photographic systems.

Figure 8:
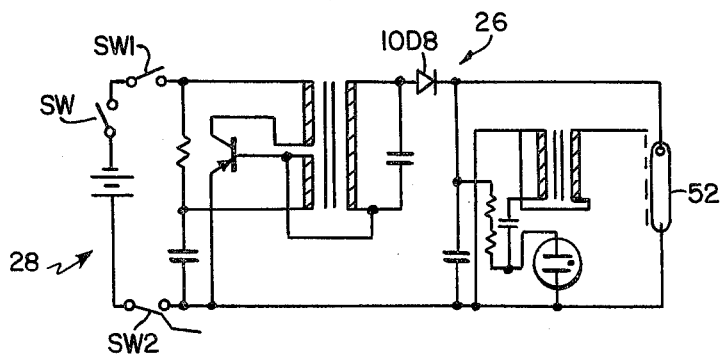
FIG. 8 is a circuit diagram.

Referring to FIG. 8 of the drawings which shows the circuit diagram, the power pack is indicated at 26, the battery at 28, the lamps at 52, the ON/OFF switch at SW1, and the pressure switch at SW2. The switch SW provides for intermittent illumination.

It should be understood that the present disclosure is for the purpose of illustration only and includes all modifications or improvements which fall within the scope of the appended claims.

What is claimed is:

1. A mobile copier comprising a housing, rotatable means mounted to the housing with a portion thereof forming a surface movable in contact with the matter to be copied to traverse the housing relative to the matter to be copied, a printable paper, a fixing medium, means operative by movement of the housing as it is traversed accross the matter to be copied to move corresponding lengths of the paper into position for exposure and an optical train including a reflector for receiving and focusing successive increments of the material to be copied as successive lengths of the printable paper are moved into position to expose the latter to the image of the matter to be copied, wherein the housing comprises two separable sections, wherein the rotatable means is mounted to one of the sections and one of said sections contains the optical train, the printable paper and the fixing medium, and wherein the module containing the printable paper embodies a blade and means for guiding the paper over the edge of the blade.

2. A mobile copier comprising a housing, rotatable means mounted to the housing with a portion thereof forming a tread surface movable in contact with the matter to be copied to traverse the housing relative to the matter to be copied, a printable paper, means operative by movement of the housing as it is traversed across the matter to be carried to move corresponding lengths of the paper into position for exposure and an optical train including a reflector for receiving and focusing successive increments of the material to be copied as successive lengths of the printable paper are moved into position to expose the latter to the image of the matter to be copied, wherein the housing comprises two modules and wherein the tractor means is mounted to one of the modules and one of said module contains the optical train, the printable paper and the fixing medium, and means for illuminating the matter to be copied, a control circuit for energizing said means and switches in said control circuit comprising an ON/OFF switch, a pressure-sensitive switch and an intermittently operable switch.

3. A copier according to claim 2 wherein the on/off switch in its off position prevents energization of the control circuit, the pressure switch operates to energize the control circuit only when the copier is held engaged with the matter to be copied and the intermittent switch is operated intermittently by movement of the copier to effect illumination of the matter to be copied at intervals corresponding to the incremental lengths of the paper presented for copying.

4. A copier according to claim 2 wherein the means for illuminating the material to be printed is a lamp.

5. A continuous motion hand movable copier comprising a housing, rotating means coupled to said housing with a portion thereof forming a frictional surface for rotation by frictional contact with the original matter to be copied; a direct print photo developable paper supported by said housing, means coupled to said rotating means and operative by movement of said rotating means for moving said paper into position for exposure; a rare gas flash light source for illuminating the original matter to be copied on the printable paper, an optical system including a reflector for imaging the reflected light from the original matter to be copied onto the paper and said rotating means includes means for controlling the flashing of the light source as it rotates to prevent double exposure.

* * * * *